United States Patent [19]
Jacqui

[11] Patent Number: 5,336,136
[45] Date of Patent: Aug. 9, 1994

[54] PLANETARY REDUCTION GEAR FOR TUBULAR MOTOR

[75] Inventor: Thierry Jacqui, Sallanches, France

[73] Assignee: Somfy, France

[21] Appl. No.: 980,463

[22] Filed: Nov. 23, 1992

[30] Foreign Application Priority Data

Dec. 10, 1991 [FR] France ............... 91 15302

[51] Int. Cl.$^5$ ............................. F16H 1/28
[52] U.S. Cl. ........................ 475/337; 475/275; 475/331
[58] Field of Search .............. 475/275, 331, 337

[56] References Cited

U.S. PATENT DOCUMENTS

| 1,320,530 | 11/1919 | Buehler | 475/331 X |
| 4,158,972 | 6/1979 | Chamberlain | 475/331 X |
| 4,417,185 | 11/1983 | Bullat | 318/2 |

FOREIGN PATENT DOCUMENTS 2376285 7/1978 France .
2480846 10/1981 France .

*Primary Examiner*—Allan D. Herrmann
*Attorney, Agent, or Firm*—Laff, Whitesel, Conte & Saret

[57] ABSTRACT

Planetary reduction gear mounted in the tube of a tubular motor. The reduction gear has at least one input stage and one output stage and a satellite holder secured to the output shaft of the reduction gear. The ring gear of the reduction gear has two parts rotationally immobilized in the tube and one part meshes with the satellites of the input stage and the other part meshes with the satellites of the output stage. The two ring gear parts are connected to one another by a connection component interlocked axially in each of the two ring gear parts and fixed to the tube. This allows the ring gear to be immobilized more completely; the diameter of the output shaft may be greater and the reduction gear may be designed ion a modular form.

9 Claims, 3 Drawing Sheets

PLANETARY REDUCTION GEAR FOR TUBULAR MOTOR

FIELD OF THE INVENTION

The subject of the present invention is a planetary reduction gear mounted in the tube of a tubular motor in which its ring gear is rotationally immobilised and comprising at least two stages, namely an input stage and an output stage in which the satellite holder is secured to the output shaft of the reduction gear.

PRIOR ART

Known tubular motors, such as those described for example in the French Patents No. 2,480,846 and 2,376,285, for driving a tube for winding up wind-up blinds or shutters, as well as for driving doors, consist of a motor and a planetary reduction gear which are arranged end to end in a tube fixed to the stator of the motor and to the ring gear of the planetary reduction gear so as to immobilize said ring gear. The reduction gear generally comprises two or three stages in which the satellites roll in a common ring gear fixed to the tube by means of screws. In order to ensure as small as possible a diameter for the tubular motor, the tube has a very thin wall and the fixing screws act via their fan head in a hole of the tube in a key-type manner. Considering the transmission torques to be withstood and the starting and stopping jolts, the stress of the screws and of the tube is extremely high and the screws must be strongly anchored in the synthetic material generally constituting the reduction gear. The corresponding current construction is shown in FIG. 1. The shaft 1 of the motor, the ring gear 2 of the three-stage reduction gear, the tube 3 secured to the stator of the motor and fixed to the ring gear 2 by pan head screws such as the screw 4 and the output shaft 5 driving a winding tube which is not shown can be seen. It is noted that the anchoring of the screw 4 is ensured by a significant quantity of material extending radially and axially in front of the last stage of the reduction gear. This material represents a significant axial bulk and further limits the diameter of the output shaft and consequently the torque to the output of the reduction gear.

SUMMARY OF THE INVENTION

The objective of the invention is to produce a means of fixing the tube to the reduction gear which means does not exhibit the drawbacks of the prior art.

In the planetary reduction gear according to the invention, the ring gear of the reduction gear consists of two parts one of which meshes with the satellites of the input stage and the other meshes with the satellites of the output stage, these two ring gear parts being connected to one another by an interposed linking component interlocked axially in each of the two ring gear parts and fixed to the tube.

The interposed linking component may be a high strength, short component, and its radial bulk has no influence on the diameter of the output shaft of the reduction gear. The tube is preferably fixed in local portions of excess thickness of the linking component, coupling-claw-shaped portions of excess thickness contributing to the interlocking without influencing the length of the reduction gear.

The construction according to the invention has, as a corollary, another significant advantage. Since the ring gear of the reduction gear is in two parts, the reduction gear can be designed in a modular form. Mounting of the reduction gear is facilitated and the output stage, in particular the shape of the output shaft, can be adapted to the requirement, without modifying the input stage, that is to say without increasing the stocks of this input stage.

BRIEF DESCRIPTION OF THE DRAWINGS

The appended drawing represents, by way of example, an embodiment of the reduction gear according to the invention, as well as variants thereof.

DESCRIPTION OF THE PREFERRED EMBODIMENT

Figure 1:
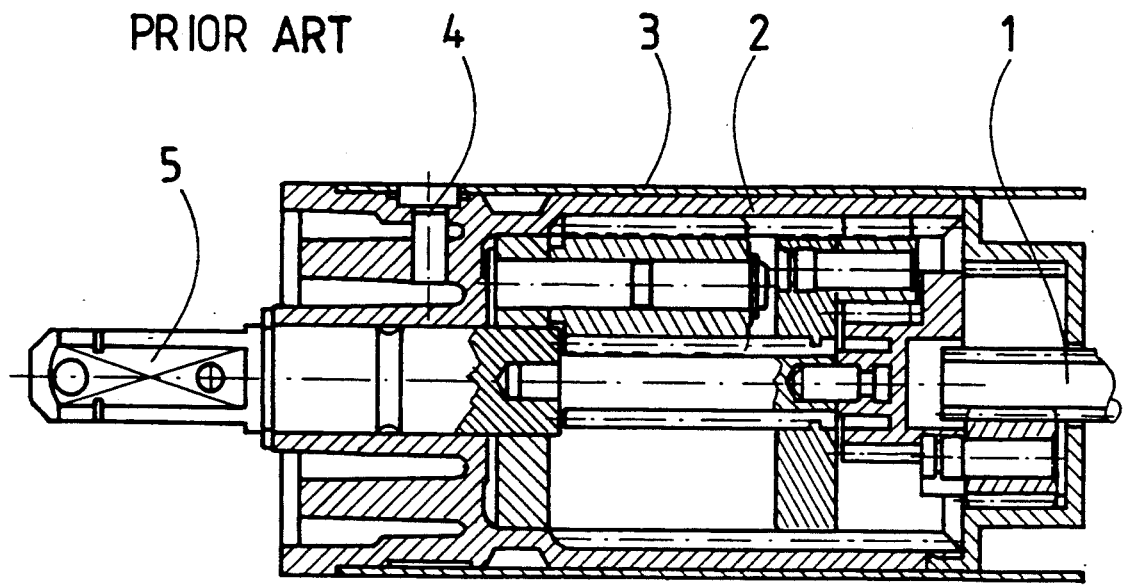
FIG. 1 is sectional view similar to FIG. 2 showing a planetary reduction gear according to the prior art.
Figure 3:
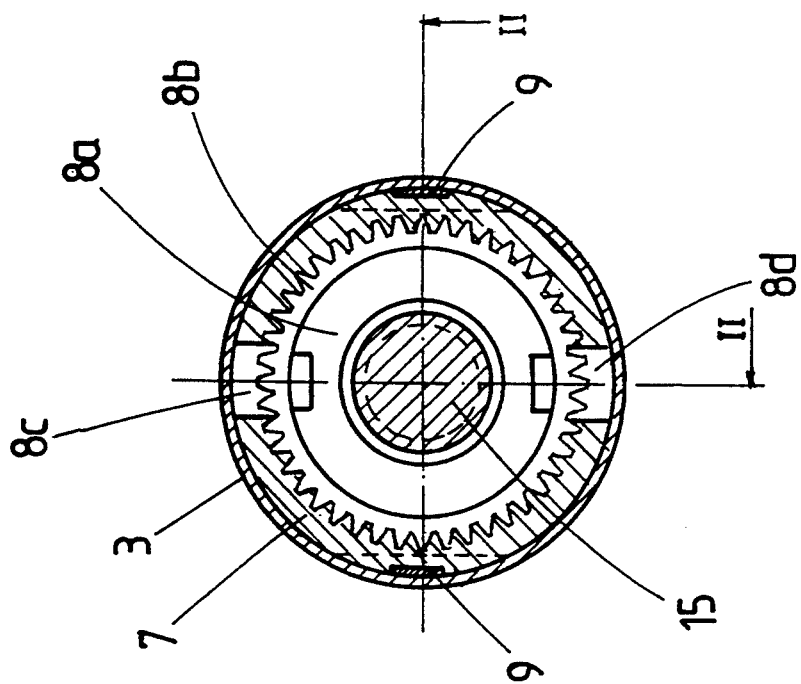
FIG. 3 is a sectional view along III—III of FIG. 2.
Figure 2:
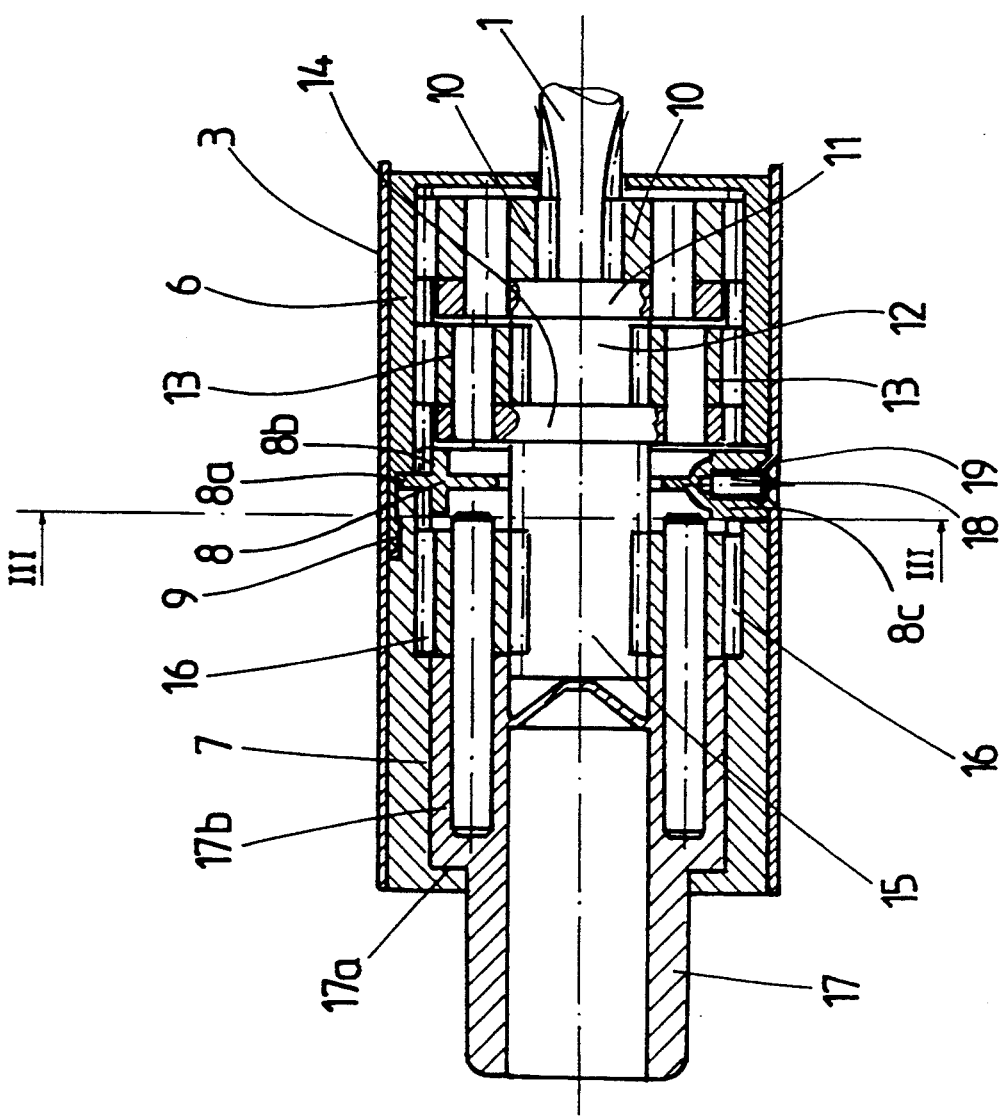
FIG. 2 is a sectional view, along II—II of FIG. 3, of a planetary reduction gear according to the main embodiment.

FIGS. 2 and 3 show a three-stage planetary reduction gear like the reduction gear shown in FIG. 1. The ring gear of this planetary reduction gear consists of two parts 6 and 7 made from a synthetic material and between which a metal interposed linking component 8 is arranged. The part 6 is fastened to the part 7 by two hooks 9 formed at the end of two axial tabs 60 and each being fastened into a notch formed in the part 7. This fastening is locked by the tube 3 which prevents the tabs from bending.

The shaft 1 of the motor drives three satellites 10 mounted on a satellite holder 11 and rolling in the teeth of the part 6 of the ring gear. The satellite holder 11 is secured to a sun gear 12 driving three satellites 13 carried by a satellite holder 14 and rolling in the teeth of the part 6 of the ring gear. The satellite holder 14 is secured to a sun gear 15 driving three satellites 16 rolling in the teeth of the part 7 of the ring gear and mounted directly on the output shaft 17. The planetary reduction gear therefore comprises three stages characterised by the three sets of satellites. The part 7 of the ring gear has a smooth part, in front of the satellites 16, which serves as a bearing for the shaft 17.

The interposed linking component 8 is arranged between the second and the third stage of the reduction gear. It consists of a disk 8a clamped between the two parts 6 and 7 of the ring gear and having, at an intermediate point of its radius, a toothed rim 8b extending on either side of the disk 8a and the teeth of which correspond to the teeth of the ring gear of the reduction gear and which is in engagement, on the one side, with the part 6 of the ring gear and, on the other side, with the part 7 of the ring gear. In other words, the intermediate component 8 is interlocked in each of the parts of the ring gear of the reduction gear. At two diametrically opposed points, the disk 8a further has two excess thickness portions of square shape, 8c and 8d respectively, which are interlocked in cut-outs in the edge of each of the parts 6 and 7 of the ring gear. These excess thickness portions i.e. pegs 8c and 8d contribute therefore to the interlocking of the linking component, but they are used, first and foremost, for fixing the tube 3 by means of countersunk head screws 18 which are screwed into each of the excess thickness portions i.e. pegs 8c and 8d, the latter having a conical hollowing 19 of sufficient depth to allow the sheet metal constituting the tube 3 to be deformed and to be clamped between the head of the screw and the bottom of this hollowing. This makes it possible to use countersunk head screws flush with the outer surface of the tube 3 with a very thin tube 3, the holes made in the tube 3 having a diameter just sufficient to allow the passage of the threaded part of the screws 18. The fixing of the tube 3 is thus much stronger than the fixing according to the prior art.

Producing the ring gear of the reduction gear in two parts facilitates the construction and mounting of the reduction gear. The two parts 6 and 7 of the ring gear of the reduction gear may be produced in the form of pots having simply a passage for the shaft 1 of the motor, and the output shaft 17 respectively. The sun gears 12 and 15, with their satellite holders, can simply be introduced into the part 6 of the ring gear. The same applies to the output shaft 17 which is simply inserted into the part 7 of the ring gear in which it is axially retained by a bearing surface 17a. The diameter of the output shaft 17 may be substantially greater than in the prior art and it is made in one piece with the satellite holder 17b carrying the satellites 16, which reduces the number of components and simplifies the manufacture. The production is modular, because it is possible to combine output stages, having output shafts 17 of different diameters and shapes, with the first two stages of the reduction gear.

Figure 4:
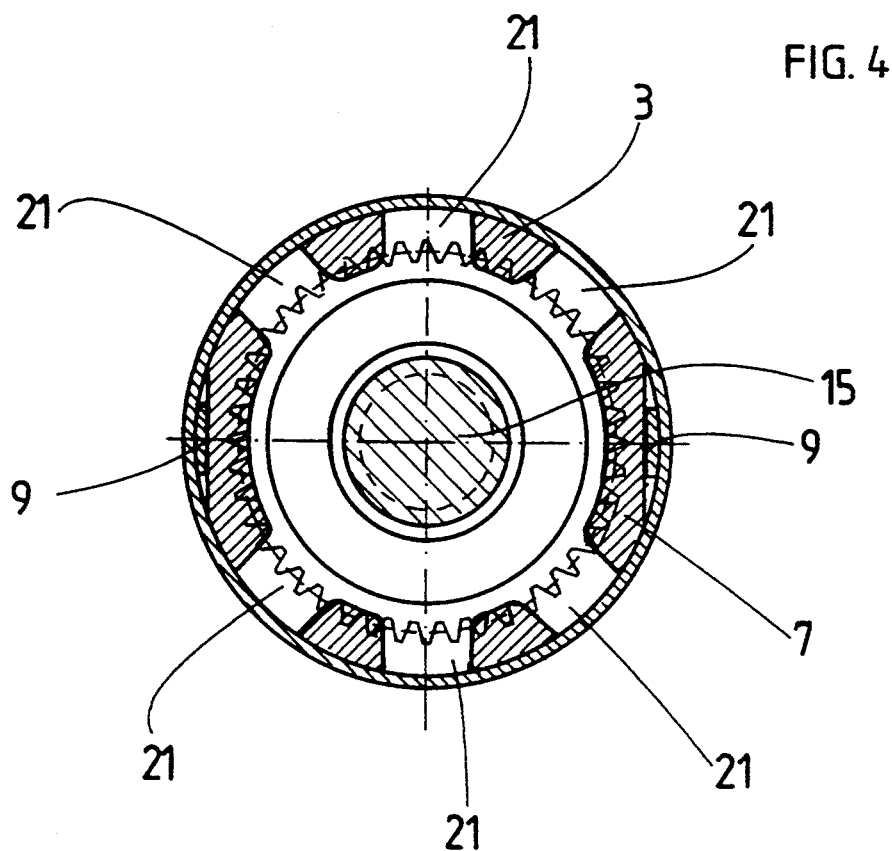
FIG. 4 shows a first embodiment variant of the linking component viewed along a section similar to the section III—III.

In the embodiment variant shown in FIG. 4, the interposed linking component 8 is replaced by a solid component 20 having a thickness substantially equal to the width of the rim 8b of the component 8 and equipped with 6 coupling claws 21 which engage in nicks made in each of the parts 6 and 7 of the ring gear so as to interlock. The tube 3 is fixed to the component 20 by means of screws similar to the screw 18 screwed into two opposing coupling claws.

Figure 5:
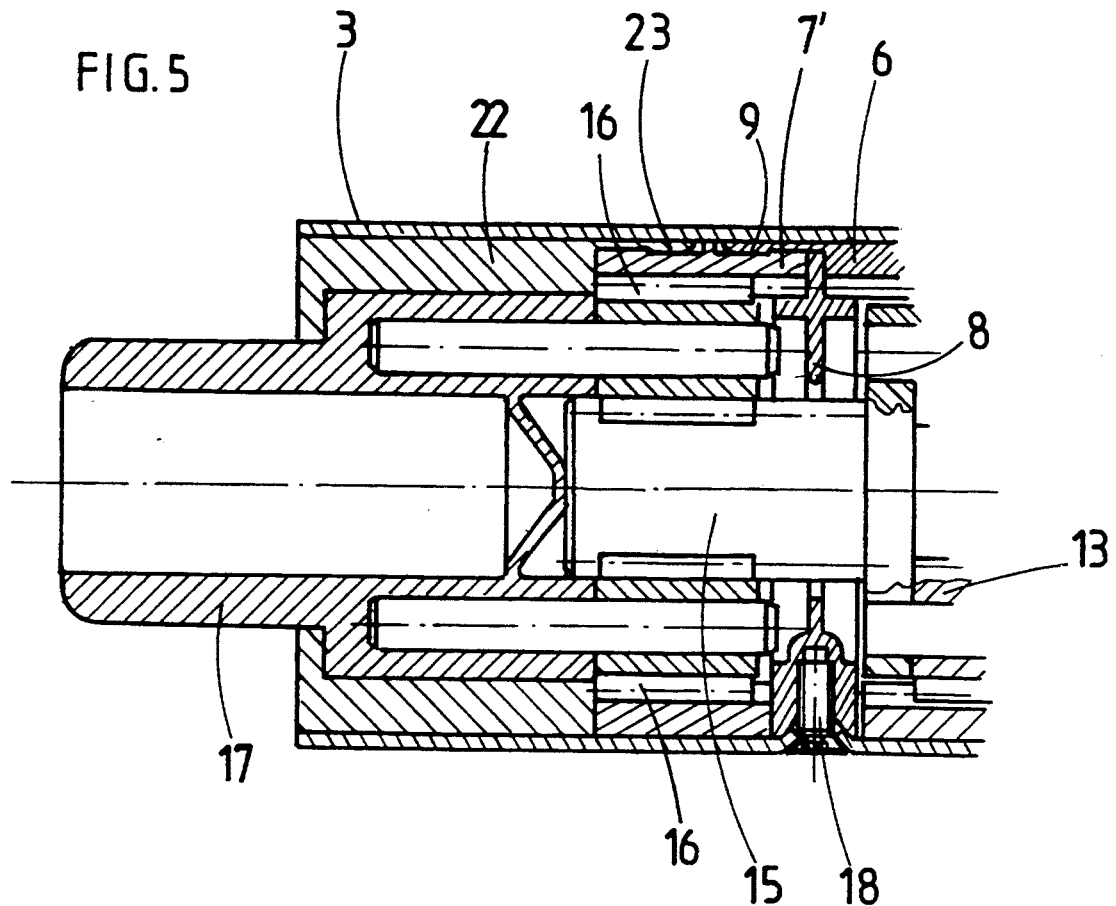
FIG. 5 shows a second embodiment variant.

Another embodiment variant is shown in FIG. 5. This figure is a section similar to the section II—II. The second part 7 of the ring gear is replaced here by a second part 7' which is substantially shorter as it does not extend beyond the satellites 16 of the output stage. A component 22 constituting the bearing for the output shaft 17 is fastened to this part 7'. This bearing 22 is fastened to the part 7' of the ring gear by two hooks 23 similar to the hooks 9 and locked like the latter by the tube 3. This construction makes it possible to use different materials for the parts 7' of the ring gear and the bearing 22. In particular, the bearing 22 can be made from self-lubricating plastic, while the ring gear part 7' is made from hard plastic.

Figure 6:
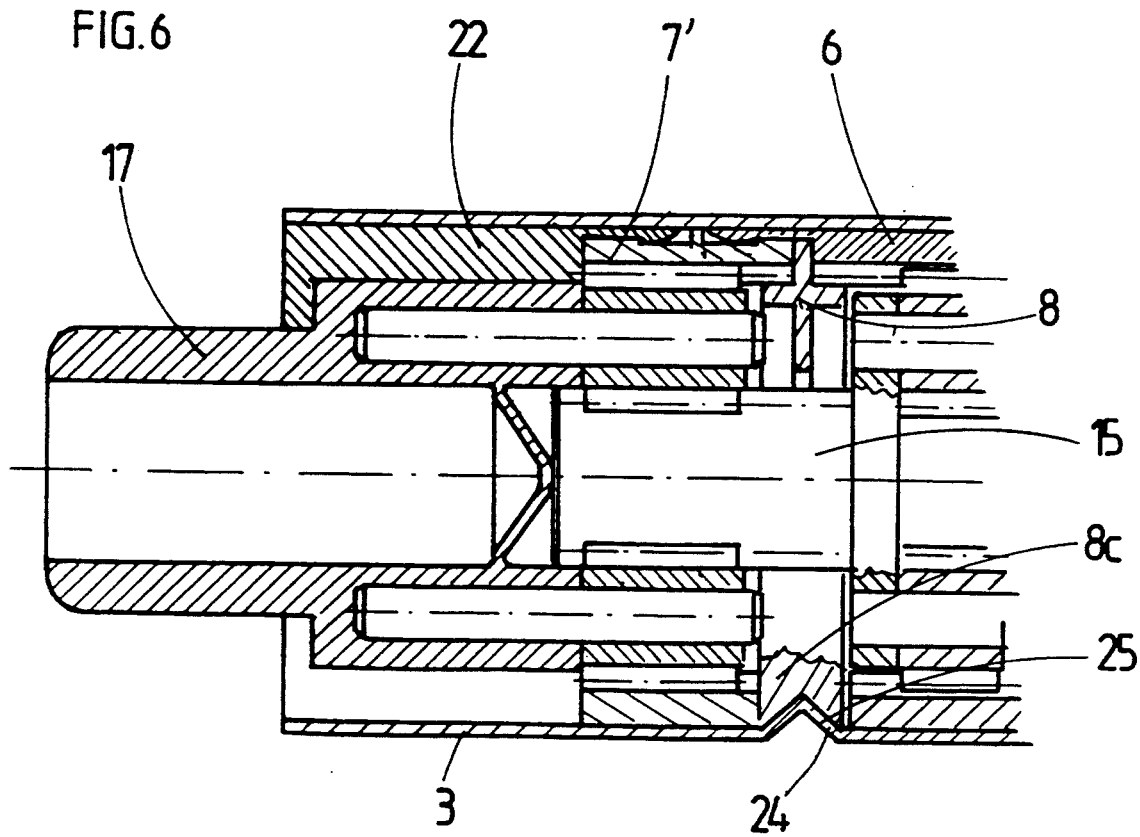
FIG. 6 shows a third variant also comprising the modification according to the second embodiment variant.

FIG. 6 shows a third embodiment variant comprising the modification according to the preceding variant. In this third variant, the tube 3 is not fixed to the linking component 8 by means of screws, but by pushing the wall of the tube 3, as shown at 24, back into hollows or depressions 25 in the excess thickness portions 8c of the linking component 8. This fixing method can of course be applied to the variant according to FIG. 4.

The embodiments described are of course capable of being modified in detail in several ways. In particular, the elastic hooks and the notches can be reversed both on each of the parts 6 and 7 of the ring gear and on the bearing 22 and the part 7' of the ring gear. The interposed linking component can have other shapes and other interlocking means. The output shaft of the reduction gear and the satellite holder of the output stage could consist of two distinct components.

I claim:

1. A planetary reduction gear mounted in a tube of a tubular motor comprising a ring gear rotationally immobilized, an output shaft, at least an input stage, a satellite holder secured to the output shaft ring gear consists of two ring gear parts one ring gear part meshes with satellites of the input stage and the other ring gear part meshes with satellites of the output stage, said two ring gear parts being connected to one another by an interposed linking component (8; 20) interlocked axially in each of the two ring gear parts and fixed to the tube.

2. The planetary reduction gear as claimed in claim 1, wherein the interposed linking component has external teeth corresponding to internal teeth of the two ring gear parts which external teeth are positioned for interlocking with the teeth of the two ring gear parts.

3. The planetary reduction gear as claimed in claim 2, wherein the interposed linking component has at the periphery of the teeth, at least one solid part in the form of a peg (8c) forming part of an interlocking means and in which the tube (3) is fixed.

4. The planetary reduction gear as claimed in claim 1, wherein the interposed linking component has coupling claws for interlocking with the two ring gear parts.

5. The planetary reduction gear as claimed in claim 1, wherein the two ring gear parts have mutual fastening means with an elastic tab locked by the tube.

6. The planetary reduction gear as claimed in claim 1, wherein the satellite and the output shaft are a single component.

7. The planetary reduction gear as claimed in claim 6, wherein the output shaft is mounted in a bearing connected to the other ring gear part by fastening means locked by the tube.

8. The planetary reduction gear as claimed in claim 1, wherein the tube is fixed to the linking component by means of screws.

9. The planetary reduction gear as claimed in claim 1, wherein the tube is fixed to the linking component by pushing the linking component back into at least one depression (25).

* * * * *